Oct. 7, 1947.  A. F. SPERRY  2,428,436
MANOMETER RING BALANCE
Filed May 6, 1944
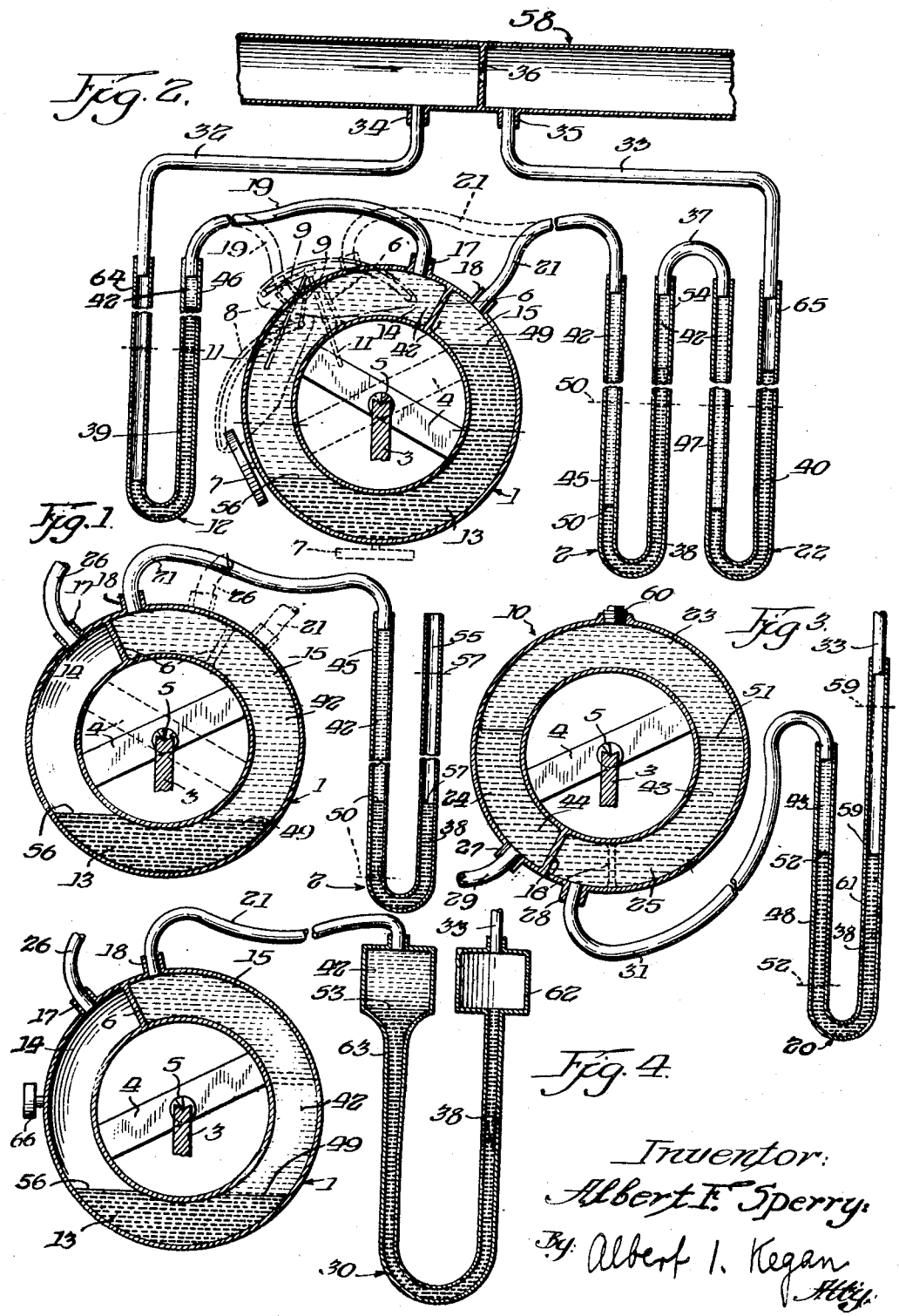
Inventor:
Albert F. Sperry
By Albert I. Kegan
Atty.

Patented Oct. 7, 1947

2,428,436

UNITED STATES PATENT OFFICE 2,428,436

MANOMETER RING BALANCE

Albert F. Sperry, Chicago, Ill.

Application May 6, 1944, Serial No. 534,394

20 Claims. (Cl. 73—205)

1

The present invention relates to pressure actuated devices, and especially to manometer ring balances.

The ring balance principle has found extensive application in the measurement of pressure and/or pressure differential, and in metering, controlling, and/or recording fluid flow. The conventional ring balance consists of a hollow ring pivoted to rotate upon its axis of symmetry, and provided with an external counterweight. The interior of the ring body is divided into two compartments by a partition in the upper portion and liquid approximately filling the lower half thereof. Each compartment normally is connected to an independent source of pressure by means of flexible tubing which does not sensibly impede the rotation of the ring body. For example, when the ring balance is used as a flow meter, one compartment is connected to the high pressure tap and the other to the low pressure tap of a primary element such as an orifice plate, Pitot tube, venturi or the like.

Flow of fluid through the primary element produces a differential pressure which is transmitted to the partition. The torque thereby created causes the ring body to rotate; said rotation lifts the counterweight and thereby creates an opposing torque. The ring body comes to rest when the two torques are equal. Therefore, the angular deflection of the ring body from its initial position is a function of the differential pressure applied to the partition. Suitable means are provided for indicating the deflection of the ring body, or for causing said deflections to operate control mechanism.

Because of the difference in pressure in the two compartments, the sealing liquid rises in the low pressure compartment, and the head due to the unbalanced column of sealing liquid prevents the fluid under measurement from blowing through the liquid seal into the low pressure compartment. Whenever the differential pressure exceeds the maximum head which the sealing liquid can provide, the fluid under measurement does blow therethrough, and the device ceases to function as a ring balance. This factor limits the operating range of the conventional ring balance to pressure differentials less than the head of a column of sealing liquid equal in height to the height of the ring body. It also places a premium upon sealing liquids of high specific gravity.

It is a principal object of the present invention to emancipate the ring balance from the foregoing limitations, thereby providing an instrument

2 characterized by a large range of effective operation.

The differential head under which a metering device will be obliged to operate cannot always be ascertained before installation of the meter. Furthermore, the range of normal operation changes from time to time with changes in plant set-up and operating procedure. While the range of operation of previously known ring balances could be varied somewhat by substituting a sealing liquid of one specific gravity for another, such changes in range are relatively small, and in actual practice the maximum head of the device is limited to that obtainable when the sealing liquid is mercury. This substance is expensive, and is becoming increasingly difficult to obtain.

Another object of the present invention is to provide a device capable of operating in a plurality of ranges of pressure differential, and which can be adjusted so that a predetermined pressure will produce maximum deflection of the ring body.

Another object is to provide a device which requires a minimum quantity of sealing liquid, and in which mercury may be replaced by inexpensive liquids of lesser density without increasing the dimensions of the ring body.

Another object is to eliminate the counterweight hitherto connected to the ring body, and thereby provide a system of reduced inertia and sluggishness.

Another object is to provide a device in which the deflection of the ring body is a predetermined non-linear function of the differential pressure applied thereto, whereby the instrument is rendered direct reading in terms of any desired function (such as rate of fluid flow), without resort to cams, mechanical linkage, etc., for extracting the square root or making analogous conversions.

Another object is to provide a meter wherein the fluid under measurement does not enter the ring body, thereby protecting the latter from any corrosive or injurious action of the former.

Another object is to provide a ring balance device of greatly increased sensibility and adapted to accurately measure very small pressures or pressure differentials.

Another object is to provide a manometric device capable of operating control, recording, and/or integrating mechanism without the use of stuffing boxes or the like, thereby eliminating error due to leakage at such points.

A further object is to provide a ring balance device of maximum accuracy, flexibility, economy, and simplicity in construction and use.

In its broad aspect, the invention comprises a rotatable hollow ring mounted upon a pivot, a partition and sufficient liquid in said ring to divide the same into two separate chambers, a liquid type manometer, and a flexible connection between said manometer and one of said chambers, said chamber and said flexible connection being completely filled with a liquid immiscible with either the liquid in the manometer or the sealing liquid in said ring. The gist of the invention resides in coupling a pivotable ring body in series with a liquid filled manometer by means of a pressure-transmitting liquid immiscible with either the sealing liquid in the ring body or the manometric liquid in the manometer, said pressure-transmitting liquid at all times having one interface in common with the sealing liquid in the ring body and another interface in common with the manometric liquid in the manometer.

The invention is exemplified in the accompanying drawing, and the foregoing and other objects, advantages and capabilities are illustrated therein, or will be apparent from the description of the invention which follows:

In the drawing:

Figure 1 is a somewhat schematic representation of a specific embodiment of the present invention, shown principally in central vertical section.

Figure 2 is a similar view of a flow meter constructed in accordance with the present invention.

Figures 3 and 4 are fragmentary views principally in central vertical section and illustrate various modifications of the invention.

Like reference characters are used to designate similar parts in the drawing and in the description of the invention which follows:

The invention in simplest form is illustrated in Figure 1, which discloses a hollow ring body 1 pivotably supported upon the uprights 3 by means of the beam 4 and knife edge 5. The interior of the ring body 1 is divided into two distinct chambers 14 and 15 by means of a partition 6 in the upper portion thereof and a mass of relatively dense liquid 13 sufficient to close the lower portion thereof. Taps 17 and 18 are provided on opposite sides of the partition 6 and serve as pressure inlets to the chambers 14 and 15, respectively. Chamber 14 communicates with a source of pressure through tap 17 and a flexible connection 26 which offers no substantial impedance to deflection of the ring body 1 upon its pivot 5. Chamber 15 communicates through tap 18 and flexible connection 21 with the arm 45 of the manometer 2, exemplified herein as a U-tube manometer. The lower portion of said manometer 2 contains a relatively dense manometric liquid 38. A pressure-transmitting liquid 42 immiscible both with the sealing liquid 13 and the manometric liquid 38 completely fills the chamber 15, connection 21, and upper portion of the arm 45 of the manometer 2. Said pressure-transmitting liquid 42 thus has one interface 49 in common with sealing liquid 13 and another interface 50 in common with manometric liquid 38, and completely fills the space therebetween. Manometer arm 55 is open to the atmosphere.

In using the apparatus of Figure 1 as a pressure gauge, communication between the fluid under test and chamber 14 is effected through connection 26, the fluid under test being allowed to fill chamber 14. Care is taken to employ a sealing liquid immiscible with said fluid. If the pressure of the fluid under test exceeds atmospheric, the ring body will rotate clockwise, the apparatus assuming the configuration indicated by the broken lines. The deflection of the ring body moves the partition 6 to the right, thereby diminishing the volume of chamber 15 and forcing a portion of the pressure-transmitting liquid 42 through the connection 21 into the manometer 2, where it depresses the interface 50 and causes the manometric liquid 38 to rise in arm 55 until the net head due to the unbalanced columns of manometric liquid 38 and pressure-transmitting liquid 42 exactly equal the pressure in chamber 14. The system then is in equilibrium, and the angular deflection of the ring body from its null position is a direct measure of the pressure under test. If the pressure under test is less than atmospheric, the ring body is deflected counterclockwise from its null position, thereby causing the surface 57 to fall until equilibrium is attained. In accordance with conventional practice, the ring body 1 is balanced so that the weight of partition 6 produces no force tending to turn said ring body 1 when said partition 6 is not at its uppermost position.

By adding manometric liquid to arm 55, the position of the ring body 1 at one-half the full scale reading can be made to correspond to any predetermined pressure greater than atmospheric. Similarly, by removing a portion of the manometric liquid therefrom, any predetermined degree of vacuum applied to chamber 14 can be made to cause the ring body 1 to deflect one-half of the full scale reading.

The construction just discussed does not employ the conventional ring balance counterweight. Elimination thereof reduces the inertia of the instrument. The rotatable ring body 1 damps the pulsations in the manometer 2. For these reasons my improved device attains equilibrium quickly, and quickly responds to changes in the pressure applied thereto.

Equal clockwise increments of angular deflection of the ring body 1 force equal quantities of the pressure transmitting liquid 42 into arm 45 of manometer 2, thereby displacing the manometric liquid 38 in equal increments. If the manometer arms 45 and 55 are of uniform cross-sectional area throughout their respective operating lengths, the head in the manometer 2 is directly proportional to the deflection of the ring body 1, and the angular position of said ring body 1 is a direct measure of the pressure applied to chamber 14 thereof. This linearity of the relation between the pressure applied and the deflection obtained is one of the many advantages of the present invention.

For a ring body of given major diameter, the angular deflection produced by any given pressure is directly proportional to the ratio between the cross-sectional areas of the bores of the manometer 2 and the hollow ring 1, because the volume of the unbalanced column of manometric liquid 38 is directly proportional to the cross-sectional area of the hollow ring 1, while the height to which said volume rises in the manometer arm 55 is inversely proportional to the cross-sectional area thereof, and the static pressure balancing the pressure of the fluid under test is directly proportional to said height. The volume of manometric liquid 38 equivalent to the pressure range of the instrument depends upon the dimensions of the ring body, and not upon the magnitude of the pressure range. The present construction, therefore, permits any given ring body to be used to measure any desired pressure or range of pressures, and to be changed from one operating range to another by the simple expedient of connecting thereto a manometer of the appropriate dimensions. Great economies in the quantity of manometric liquid necessary for operation at high pressures can be achieved by utilizing a manometer of sufficiently small bore.

Since it is not necessary to observe the position of the manometric liquid in the manometer 2, the latter need not be made of glass or other transparent material, but can be fabricated from stainless steel tubing or other structural materials having the necessary resistance to the pressures under measurement. Furthermore, since no moving part pierces the manometer wall, stuffing boxes and the errors arising from leakage therethrough are entirely eliminated.

By sufficiently reducing the bore of the manometer, the range of my manometer ring balance can be increased up to pressures approaching the bursting limits of the materials of construction. Conversely, if the bore of the manometer is large in relation to the bore of the ring body, increased sensibility is obtained, for a small head in the manometer will produce a large deflection of the ring body. With such relative proportions, the present invention is adapted to measure low pressures, even micropressures, and to detect, record and/or control small deviations from any predetermined base pressure.

Since manometer 2 may be as tall as necessary, the manometric liquid need not be extremely dense, and a wide variety of liquids may be used. Among these are mercury and other metals and alloys which are liquid under the condition of use, such as gallium, bismuth, lead, tin, Rose metal, Wood's metal, and tinman's solder when employed at temperatures above their respective melting points; and organic liquids such as acetylene tetrabromide, ethylene bromide, paraffin oil; water, etc. The sealing liquid 13 may be the same as, or different from, the manometric liquid 38. The pressure-transmitting liquid 42 need not be immiscible with the fluid under measurement. In the apparatus illustrated in Figure 1, the pressure-transmitting liquid 42 is less dense than either the manometric liquid 38 or the sealing liquid 13, and the sealing liquid 13 is more dense than the fluid under test. A few combinations suitable for the purpose of this invention are enumerated in Table 1. From a perusal thereof numerous other combinations will suggest themselves to those skilled in the art.

Table 1

| | Fluid Being Metered | Sealing Liquid | Pressure-transmitting Liquid | Manometric Liquid |
|---|---|---|---|---|
| 1 | Water, Steam, Brines, Oil | Mercury | Water | Mercury. |
| 2 | Water, Steam, Brines, Oil | ----do---- | Mineral Oil | Do. |
| 3 | Water, Steam, Brines | tetrachloro ethane | Water | tetrachloro ethane. |
| 4 | Water, Steam, Brines | ----do---- | ----do---- | dibromo ethylbenzene. |
| 5 | Water, Steam, Brines | dibromo ethylbenzene | ----do---- | Do. |
| 6 | Water, Steam, Brines | ----do---- | ----do---- | tetrachloro ethane. |
| 7 | Water, Steam, Brines | Mercury | ----do---- | Do. |
| 8 | Water, Steam, Brines | ----do---- | ----do---- | dibromo ethylbenzene. |
| 9 | Oils | aqueous glycerol | Mineral Oil | aqueous glycerol. |
| 10 | Ammonia | Mercury | ----do---- | Mercury. |
| 11 | Coal gas | ----do---- | ----do---- | Do. |
| 12 | ----do---- | ----do---- | ----do---- | glycerol. |
| 13 | ----do---- | Glycerol | ----do---- | Do. |
| 14 | ----do---- | ----do---- | ----do---- | Mercury. |
| 15 | Natural gas | dibromo ethylbenzene | Water | dibromo ethylbenzene. |
| 16 | Chlorine | sulphuric acid (100%) | Mineral Oil | sulphuric acid (100%). |

The term "brine" in the foregoing table includes aqueous solutions of mineral salts, such as sodium chloride and magnesium chloride.

The apparatus of Figure 1 obviously is operative when the connections are reversed. That is, the manometer arm 55 may be connected with the fluid under measurement, and the chamber 14 may be left open to the atmosphere. Interposing the manometer 2 between the fluid under measurement and the ring body 1 is especially desirable when the fluid under measurement is corrosive. This arrangement also permits wider latitude in the selection of the sealing liquid 13, since it need not be immiscible with the fluid under test. For example, when water or steam is being metered, mercury may be used as the manometric liquid 38, glycerol (miscible with water) as the sealing liquid 13, and kerosene or mineral seal oil as the pressure transmitting liquid 42.

In some instances, the height of the unbalanced column of manometric liquid may be so great as to require a manometer of inconvenient dimensions. This difficulty can be obviated by utilizing a plurality of manometers. If each chamber of the ring body is connected with a manometer, the ring body and associated mechanism is completely separated from the fluid under test, and therefore shielded from any corrosive action of the latter. The above mentioned modifications and others are exemplified in the manometer ring balance flow meter shown in Figure 2 in deflected position due to the action of fluid flowing through the conduit 58 from left to right as indicated by the arrow. The null configuration of the apparatus is indicated in broken lines, the short horizontal broken lines traversing the various manometer arms and the ring body indicating the various liquid levels at zero rate of flow in conduit 58. Said conduit 58 contains a primary element, such as a Pitot or Venturi tube, or an orifice plate 36, as shown. In order that the differential pressure which exists across the primary element 36 may be conveniently measured, conventional pipe taps 34 and 35 are situated on opposite sides of the primary element 36 in the customary manner and serve as pressure inlets to the manometer flow meter. Tap 34, as shown in Figure 2, is on the high pressure side of the primary element 36, while tap 35 is on the low pressure side thereof. In this embodiment of the invention, at least one manometer is interposed between each tap and the corresponding ring chamber. For example, high pressure tap 34 communicates through connection 32 with arm 64 of manometer 12, and arm 46 of said manometer 12 communicates through the flexible connection 19 with ring chamber 14. Alternatively, a plurality of manometers may be interposed in series between one of the pressure inlets and the corresponding ring chamber, as is illustrated by manometers 2 and 22 serially connected by piping 37 and interposed between the low pressure tap 35 and ring chamber 15 by means of piping 33 and the flexible connection 21. Whereas I have shown a conventional primary element 36 installed in a conduit 58 as a means of obtaining a pressure differential, it is apparent that my novel manometer ring balance will respond to any pressure differential which exists between the connections 32 and 33, irrespective of its source.

Manometers 2, 12 and 22 contain relatively dense manometric liquids 38, 39, and 40 respectively, and ring body 1 contains relatively dense sealing liquid 13. These liquids may be identical chemically, or any one may differ from one or more of the others, as desired. Chambers 14 and 15, and connections 19, 21 and 37, are completely filled with pressure transmitting liquid 42, as is the space in manometer arms 45, 46, 47 and 54 above the various manometric liquids. Each body of said pressure transmitting liquid 42 is immiscible with and less dense than the sealing and manometric liquids in contact therewith.

In another variant of the invention, the ring body 1 is provided with an external counterweight 7, as well as one or more manometers. Deflection of said ring body 1 actuates indicating, recording and/or controlling mechanism, exemplified herein by, but not limited to, cam 8, linkage 9 and pen arm 11, all shown superimposed in broken lines upon Figure 2. By means of suitable mechanism, such as cam 8 and linkage 9, the movement of the element 11 may be controlled in accordance with any desired function of the movement of the ring body 1.

When the ring body is provided with a counterweight 7 as shown in Figure 2, the sealing liquid 13 is displaced upwardly within the chamber 15, just as it is in the conventional ring balance. The use of a counterweight increases the total pressure which is measured by the assembly of ring body 1 and manometers 2, 12, and 22. For this reason, the pressure range of my manometer ring balance is increased by attaching a counterweight to the ring body. The head due to the unbalanced column of sealing liquid 13 is but a fraction of the head between taps 34 and 35. Obviously the volume of pressure transmitting liquid moved out of manometer arm 46 equals that moved into ring chamber 14, which equals that moved out of ring chamber 15 into manometer arm 45, which equals that moved out of manometer arm 54 into manometer arm 47. When identical manometers are connected to both taps of a ring body provided with a counterweight, the manometer on the up-stream or high pressure side deflects about 20% more than the one on the down-stream side, due to the increment of fluid displaced by the rotation of the ring baffle 6. This effect persists when a plurality of manometers is employed on either or both sides of the ring, and is illustrated in Figure 2, wherein the manometer 12 is shown deflected more than manometers 2 and 22.

The angular deflection of the ring body 1 produced by any given rate of flow in conduit 58 is a function both of the mass of the counterweight 7 and of the cross-sectional areas of the bores of the ring body 1 and the manometers 2, 12 and 22. The sensibility and pressure range of any given instrument may be varied at will by changing the mass of counterweight 7, by changing the number of manometers or the dimensions thereof, or by using different manometric and/or sealing liquids.

In some instances, as for example when the pressure or rate of flow of a relatively dense liquid is being measured, it may be desirable to use a sealing liquid less dense than the liquid under test. Apparatus in accordance with this concept is illustrated in Figure 3, in which the ring body 10 has a partition 16 in the bottom portion thereof. The liquid under test enters chamber 24 through the flexible connection 29 and inlet 27 situated near the bottom of the ring body 10. The other chamber 25 is partially filled with a pressure-transmitting liquid 43. The hollow interior of the ring body 10 above the liquids 43 and 44 is completely filled with a selected sealing liquid 23, which has a density less than that of either the pressure-transmitting liquid 43 or the liquid under test 44, and is miscible with neither. If desired, a filling plug 60 may be provided to facilitate charging the ring body 10 with the various liquids. Separated from inlet 27 by partition 16 is the outlet 28, also situated near the bottom of ring body 10. By means of flexible connection 31 attached to said outlet 28 and filled with the pressure-transmitting liquid 43, the ring body 10 communicates with a manometer 20 containing manometric liquid 38 of density greater than that of the pressure-transmitting liquid 43. The interface between liquids 43 and 38 is indicated at 52, and the upper surface of the manometric liquid 38 in manometer arm 61 is shown at 59. The deflected position of the apparatus is indicated in broken lines. If the apparatus is used as a flow meter, arm 61 will communicate by means of the connection 33 with the low pressure tap of the primary element.

Table 2 enumerates, purely for purposes of illustration, a few combinations of liquids suitable for use in the apparatus of Figure 3. The possibility of any mixing between the light sealing liquid 23 and the fluid being metered (such as the coal tar or crude petroleum mentioned in items 2 and 3 of Table 2) can be prevented by inserting a second manometer between the chamber 24 and the material under test, in the manner fully illustrated and described in connection with Fig. 2.

Table 2

| | Fluid being metered | Manometric liquid 38 | Pressure transmitting liquid 43 | Floating liquid 23 |
|---|---|---|---|---|
| 1 | Sulphuric acid | Tetrachloroethane. | Water | Kerosene. |
| 2 | Coal tar | Mercury | Glycerol | Oil. |
| 3 | Crude petroleum | ....do | ....do | Do. |
| 4 | Anhydrous liquid ammonia. | Ethylene bromide | Ethylene glycol | Do. |
| 5 | ....do | Mercury | ....do | Do. |

By properly shaping the manometer the deflection of the ring body may be controlled in accordance with any desired function of the pressure or differential pressure under test. Such a construction obviates any necessity for using cams, linkage, or other mechanical devices in order to make the instrument direct reading in terms of a desired function. Figure 4 presents an exemplification of this concept, and illustrates a flow meter in which the angular displacement of the ring body 1 is linear with respect to the rate of flow. The apparatus is similar to that of Figure 1, except for the shape of the manometer 30, which is determined by the relation between rate of flow and differential pressure produced thereby. The differential pressure increases as the square of the rate of flow. In order that equal increments in the rate of flow may produce equal increments of deflection of the ring body, resistance to deflection thereof therefore must progressively increase. The static pressure resisting further deflection of the ring body 1 is directly proportional to the height of the unbalanced column of manometric liquid 38. Equal increments of angular deflection of ring body 1 displace equal volumes of pressure-transmitting liquid 42 and thus move equal volumes of manometric liquid 38. Such an increment from null position of the meter produces a relatively small head in manometer 30, due to the large cross-sectional area of the upper portion of arm 63 thereof. An equal increment near the fully deflected position of the meter produces a relatively great increment of head in manometer 30, because of the small cross-sectional area of the lower portion of arm 63 and the uniformity in dimensions of chamber 62 into which the manometric liquid is displaced. Therefore resistance to further deflection of the ring body 1 progressively increases, and successively greater increments of differential pressure are required to produce equal increments of deflection, whereby the deflection is rendered directly proportional to the rate of flow or other desired function of the net applied pressure.

When only one inlet of the ring body 1 is connected to a manometer or series of manometers, the pressure transmitting liquid 42 may exert a hydrostatic head effect through the ring chamber 15, containing said liquid 42. Said hydrostatic effect may be compensated for by attaching a compensating weight 66 to the ring body 1 opposite said chamber 15, as is shown in Figure 4.

It will be apparent that the various elements of my invention may be utilized in numerous combinations and permutations. For example, any of the arrangements shown in Figures 1–4 inclusive may be used as a flow meter, pressure gauge, liquid level controller, etc. The manometer limb 55 of Figure 1 may be connected in series with a plurality of other manometers in the manner shown in Figure 2. A manometer may be inserted between the source of pressure and the connection 26 of Figure 1 in the same manner as the manometer 12 is connected in Figure 2. The limb 61 of Figure 3 may be open to the atmosphere, as for example, when the device is used as a pressure gauge, or the connections 29 and 33 may communicate with the taps of a primary element, whereby the device may be used as a flow meter. Similarly, a counterweight may be used in connection with the structures illustrated in Figures 1, 3 and 4, in the manner illustrated in Figure 2. Furthermore, a compensating weight 66 may be attached to the structures shown in Figures 2 and 3, in the manner and for the purpose explained in connection with the description of Figure 4. The compensating weight 66 may be used either in the presence or the absence of a counterweight 7. Thus it will be apparent that while I have illustrated my invention by describing particular embodiments thereof, numerous modifications and variations therefrom may be made without departing from the scope of the present invention.

Having thus described my invention and illustrated its utility, I claim:

1. A pressure measuring device characterized by the fact that no counterweight is attached to the rotatable torus thereof, comprising a hollow torus rotatably mounted on a support, liquid and a partition dividing the interior of said hollow torus into two compartments, a connection between one of said compartments and a source of pressure, a stationary U-tube, a connection between the other compartment of said torus and one arm of said U-tube, liquid in the bend of said U-tube, and liquid immiscible with the liquid in the bend of said U-tube and with the liquid in said torus and completely filling the space therebetween, thereby enabling the pressure under measurement to rotate said torus until said pressure is counterbalanced by the hydrostatic head generated in said U-tube.

2. A measuring device as defined in claim 1, wherein the diameter of the bore of the U-tube is small in comparison with the diameter of the bore of the hollow torus.

3. A measuring device as defined in claim 1, wherein the U-tube has a shaped arm whereby the deflection of said hollow torus is controlled in accordance with a function of the variable under measurement.

4. The combination with a ring balance having no counterweight and comprising a hollow torus rotatably mounted on a support, and sealing liquid and a partition dividing the interior of said hollow torus into two compartments; of means for controlling the deflection of said torus in accordance with a function of the variable under measurement, said means comprising stationary manometric means having a geometrical shape determined by said function, manometric liquid in said manometric means, a connection between said manometric means and one of the compartments in said ring balance, and a body of liquid immiscible both with said sealing liquid and with said manometric liquid and filling the space therebetween.

5. In a manometric ring balance including a ring body, sealing liquid therein, stationary manometric means, and manometric liquid therein; means for transmitting pressure between said sealing liquid and said manometric liquid, comprising a tubular connection between said ring body and said manometric means, and a body of liquid in said tubular connection in contact with both said sealing liquid and said manometric liquid, and miscible with neither.

6. A manometer ring balance having no counterweight and including a stationary manometer and a rotatable ring body, wherein at least part of the pressure under measurement is balanced against a hydrostatic head generated in said manometer by rotation of said ring body, comprising a support, a hollow ring body pivoted thereon, means for indicating the deflection of said ring body, a first body of liquid and a partition in the interior of said ring body dividing the same into two compartments, a flexible connection communicating one of said compartments with a source of pressure, a stationary liquid differential manometer, a second flexible connection communicating the other compartment with said manometer, a second body of liquid in said manometer, and a third body of liquid in said manometer, said ring body, and said second flexible connection connecting said first and second bodies of liquid and miscible with neither.

7. A pressure-responsive measuring device including a rotatable portion and a stationary liquid differential manometer, wherein the applied pressure rotates said portion and generates in said manometer a hydrostatic head which opposes further rotation of said portion, comprising a support, a hollow torus rotatably mounted thereon, a counterweight therefor, liquid and a partition dividing the interior of said hollow torus into two compartments, a connection between one of said compartments and a source of pressure, a liquid differential manometer, a connection between the other compartment and said manometer, manometric liquid in said manometer, and liquid immiscible with said manometric liquid and with the first-mentioned liquid in said torus and filling the space therebetween in said torus, said last named connection, and said manometer.

8. A measuring device as defined in claim 1, wherein mercury comprises the first mentioned liquid and the liquid in the bend of the U-tube, and water comprises the liquid immiscible therewith.

9. A ring-balance device characterized by the absence of an external counterweight, comprising a support, a hollow torus pivoted thereon, indicating means operated by the deflection of said torus, a partition in the upper portion and sealing liquid in the lower portion of the interior of said hollow torus dividing the same into two chambers, a flexible connection communicating the first chamber with a source of pressure, a U-tube, a second flexible connection communicating the second chamber with one arm of said U-tube, manometric liquid in the lower portion of said U-tube, and a third liquid immiscible with and less dense than said sealing liquid and immiscible with and less dense than said manometric liquid filling said second chamber, said second flexible connection, and said U-tube arm above said manometric liquid.

10. A device as defined in claim 9, wherein the sealing liquid is glycerol, the manometric liquid is mercury, and the third liquid immiscible with the foregoing liquids is mineral oil.

11. A device as defined in claim 9, wherein tetrachloro ethane comprises both the sealing liquid and the manometric liquid, and water comprises the liquid immiscible therewith.

12. A measuring device comprising a ring balance and a plurality of stationary liquid differential manometers; said ring balance comprising a support, a hollow torus pivoted thereon, means for indicating the deflection thereof, sealing liquid and a partition dividing the interior of said hollow torus into two compartments, and a pressure inlet for each of said compartments; said manometers being connected in series, the first being connected to a source of pressure, and the last being connected to the pressure inlet for one of said compartments, each of said manometers containing manometric liquid; the compartment connected with said manometers, the connection between said compartment and the last of said manometers, and the connections between manometric liquid in said manometers all being filled with pressure transmitting liquid immiscible with the liquid masses in contact therewith.

13. A manometer ring balance, comprising a support, a hollow torus pivoted thereon, a partition in the lower portion and sealing liquid in the upper portion of the interior of said hollow torus dividing the same into two compartments, a flexible connection communicating the first compartment with a source of fluid under pressure, whereby said first compartment is filled with said fluid, said sealing liquid being less dense than said fluid, one or more liquid differential manometers, a second flexible connection communicating the second compartment with said one or more manometers, and manometric liquid in the lower portions of said one or more manometers; said second compartment, said second flexible connection, and said one or more manometers connected therewith being filled with a third liquid immiscible with and more dense than said sealing liquid and immiscible with and less dense than said manometric liquid.

14. A device as defined in claim 13, wherein mineral oil comprises the sealing liquid, mercury comprises the manometric liquid, and glycerol comprises the third liquid.

15. A manometer ring balance wherein at least part of the pressure differential between two sources of pressure under measurement is counterbalanced in a stationary portion thereof, said ring balance comprising: a support; a hollow ring body pivoted thereon; a first liquid and a partition in the interior of said ring body dividing the same into two compartments, each of said compartments having a pressure inlet; stationary manometric means; flexible tubing connecting at least one of said pressure inlets with said manometric means; said ring body, said flexible tubing and said manometric means all interposed between said sources of pressure and in series with each other; a second liquid in said manometric means; and liquid substantially insoluble in said first and second liquids and hydraulically connecting said liquids in series.

16. A manometer ring-balance wherein at least part of the pressure differential under measurement is counter-balanced in a stationary manometer portion thereof, said ring-balance comprising: a support; a hollow ring body pivoted thereon; sealing liquid and a partition in the interior of said ring body dividing the same into two compartments; a connection communicating one of said compartments with a source of pressure; a second connection communicating the other of said compartments with a second source of pressure; at least one stationary, liquid differential manometer interposed between at least one of said compartments and its respective pressure source; manometric liquid in said manometer; and pressure transmitting liquid immiscible with said sealing liquid and said manometric liquid and filling the space therebetween.

17. A manometer ring balance wherein at least a part of the pressure under measurement is counter-balanced in a stationary manometer portion thereof, said ring balance comprising: a support; a hollow ring body pivoted thereon; sealing liquid and a partition in the interior of said ring body dividing the same into two compartments; a flexible connection communicating one of said compartments with a source of pressure; a second flexible connection communicating the other of said compartments with a second source of pressure; one or more stationary liquid differential manometers connected in series and interposed between one of said compartments and its pressure source; manometric liquid in each of said differential manometers; and connecting liquid immiscible with said sealing liquid and said manometric liquid in series contact with said other liquids.

18. A manometer ring balance wherein at least part of the pressure differential between two sources of pressure under measurement is counter-balanced in a stationary portion thereof, said ring balance comprising: a support; a hollow ring body pivoted thereon; a weight attached to said ring body; a first liquid and a partition in the interior of said ring body dividing the same into two compartments, each of said compartments having a pressure inlet; stationary manometric means; flexible tubing connecting at least one of said pressure inlets with said manometric means; said ring body, said flexible tubing and said manometric means all interposed between said sources of pressure and in series with each other; a second liquid in said manometric means; and a third liquid substantially insoluble in said other liquids; said first, second, and third liquids forming a continuous hydraulic series connection.

19. The combination with a ring balance comprising a hollow torus rotatably mounted on a support, sealing liquid and a partition dividing the interior of said torus into two compartments, and two connections communicating said compartments respectively to different sources of pressure; of means hydraulically sealing said torus and its contents against direct contact with the fluid under measurement and hydraulically resisting deflection of said torus; said means comprising: at least one liquid differential manometer interposed in each of said connections between said compartments and their respective pressure sources, manometric liquid in said manometers, and liquid immiscible with said sealing liquid and said manometric liquid and filling the spaces therebetween in said ring body, said connections, and said manometers.

20. A pressure responsive measuring device wherein the applied pressure rotates a rotatable ring portion completely filled with liquid and generates in a stationary manometer portion a hydrostatic head which opposes further rotation of said ring portion, comprising: a support; a hollow torus thereon, liquid and a partition dividing the interior of said hollow torus into two compartments; liquid differential manometers, two flexible connections; at least one liquid differential manometer connected to one of said compartments by one of said connectors; at least one liquid differential manometer connected to the other of said compartments by the other of said connectors; manometric liquid in the bottom portion of said manometers; and pressure transmitting liquid immiscible with and inert to said other liquids and filling the space therebetween in said torus, said connectors, and all of said manometers.

ALBERT F. SPERRY.

REFERENCES CITED

The following references are of record in the file of this patent:

UNITED STATES PATENTS

| Number | Name | Date |
|---|---|---|
| 1,990,633 | Brandl | Feb. 12, 1935 |
| 2,280,325 | Vetter | Apr. 21, 1942 |
| 2,331,153 | Ackley | Oct. 5, 1943 |
| 2,370,095 | Vetter | Feb. 20, 1945 |

FOREIGN PATENTS

| Number | Country | Date |
|---|---|---|
| 648,251 | Germany | July 26, 1937 |

Certificate of Correction

Patent No. 2,428,436.

October 7, 1947.

ALBERT F. SPERRY

It is hereby certified that errors appear in the printed specification of the above numbered patent requiring correction as follows: Column 6, line 8, for "purpose" read *purposes*; column 8, lines 69 and 70, beginning with "The possibility" strike out all to and including "Fig. 2." in column 9, line 2, and insert the same as a paragraph, after Table 2 and before the words "By properly", line 15, same column; and that the said Letters Patent should be read with these corrections therein that the same may conform to the record of the case in the Patent Office.

Signed and sealed this 3rd day of February, A. D. 1948.

[SEAL]

THOMAS F. MURPHY,
*Assistant Commissioner of Patents.*